United States Patent [19]

Janssen et al.

[11] Patent Number: 5,551,267
[45] Date of Patent: Sep. 3, 1996

[54] ANTI-MAGNETIC TAMPERING SYSTEM FOR AUTOMOBILE IGNITION LOCK

[75] Inventors: David C. Janssen, Whitefish Bay, Wis.; Thomas G. Osborne, Lewisville, Tex.

[73] Assignee: Briggs & Stratton Corporation, Wauwatosa, Wis.

[21] Appl. No.: 228,510

[22] Filed: Apr. 15, 1994

[51] Int. Cl.⁶ ..................................................... B60R 25/02
[52] U.S. Cl. ............................ 70/252; 307/10.3; 70/276; 70/413; 70/419; 70/439
[58] Field of Search .............................. 70/276, 419, 439, 70/441, 252, 413, 417; 307/10.3, 10.2, 10.6

[56] References Cited

U.S. PATENT DOCUMENTS

| | | |
|---|---|---|
| 3,705,369 | 12/1972 | Schwendeman ........................ 70/413 |
| 3,774,424 | 11/1973 | Ehrat . |
| 4,186,578 | 2/1980 | Sommer ................................ 70/419 |
| 4,287,733 | 9/1981 | Gomez-Olea . |
| 4,427,967 | 1/1984 | Maiocco . |
| 4,507,944 | 4/1985 | Widen et al. . |
| 4,546,266 | 10/1985 | Zenick et al. . |
| 4,603,563 | 8/1986 | Mochida et al. . |
| 4,638,882 | 1/1987 | Sato . |
| 4,643,009 | 2/1987 | Sato . |
| 4,862,139 | 8/1989 | Fukamachi et al. . |
| 4,920,338 | 4/1990 | Tsunoda et al. . |
| 4,983,947 | 1/1991 | Mullen et al. . |
| 5,202,580 | 4/1993 | Janssen . |
| 5,271,253 | 12/1993 | Cassada et al. ......................... 70/276 |

FOREIGN PATENT DOCUMENTS

| | | | |
|---|---|---|---|
| 0400453 | 12/1990 | European Pat. Off. ................. | 70/413 |
| 0464278 | 1/1992 | European Pat. Off. ................. | 70/276 |
| 2249228 | 5/1973 | France .................................... | 70/413 |
| 531433 | 8/1955 | Italy ........................................ | 70/413 |
| 522319 | 10/1976 | U.S.S.R. ................................. | 70/276 |

*Primary Examiner*—Darnell M. Boucher
*Attorney, Agent, or Firm*—Andrus, Sceales, Starke & Sawall

[57] ABSTRACT

A lock for the ignition circuit for an automobile including a Hall effect control sensor which is activated by a control magnet on the cylinder member of the lock so that when the cylinder is rotated by the key to its start position, the control sensor is activated. The activation of the control sensor provides one of several starting criteria to an ignition for starting an automobile. An anti-tampering sensor spaced from and adjacent to the control sensor has a trip level which is lower than the trip level of the control sensor so that magnetic forces induced from the exterior of the lock cannot trip the control sensor. A blocking plate is disposed between the control sensor and the anti-tampering sensor to prevent the anti-tampering sensor from being tripped by the control magnet when the cylinder member is rotated to its start position and to enable the anti-tampering sensor to be tripped first to produce a deactivation signal in response to a magnetic force induced from the exterior of the lock.

7 Claims, 1 Drawing Sheet

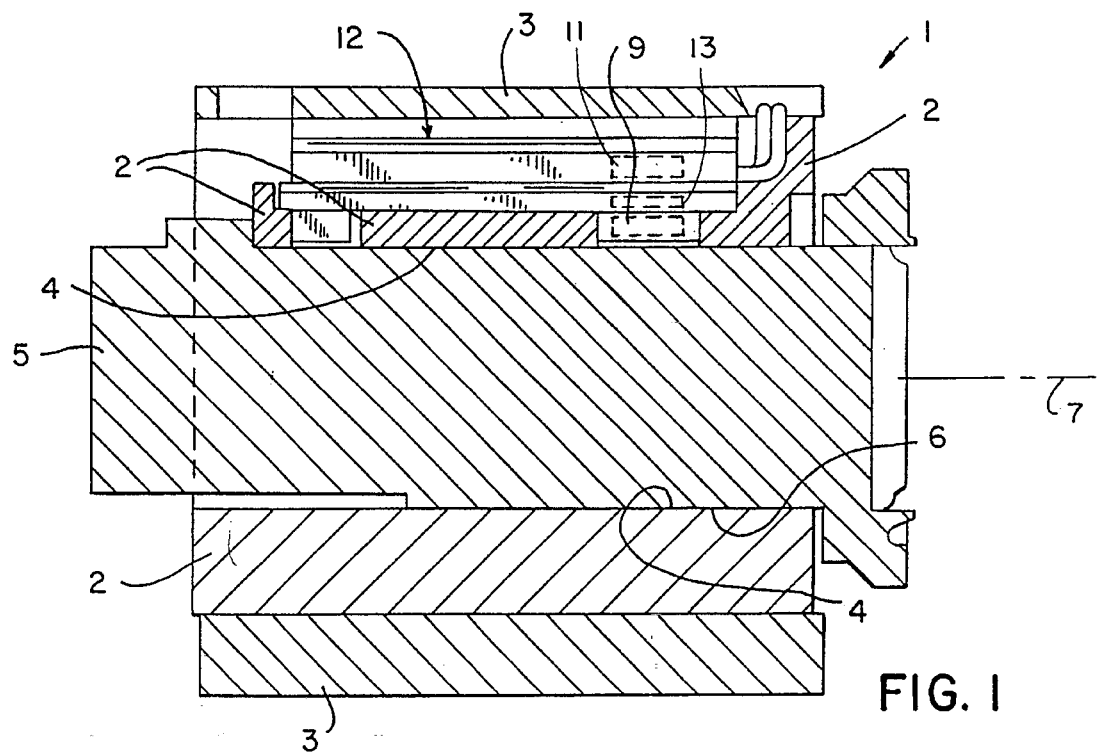
FIG. 1
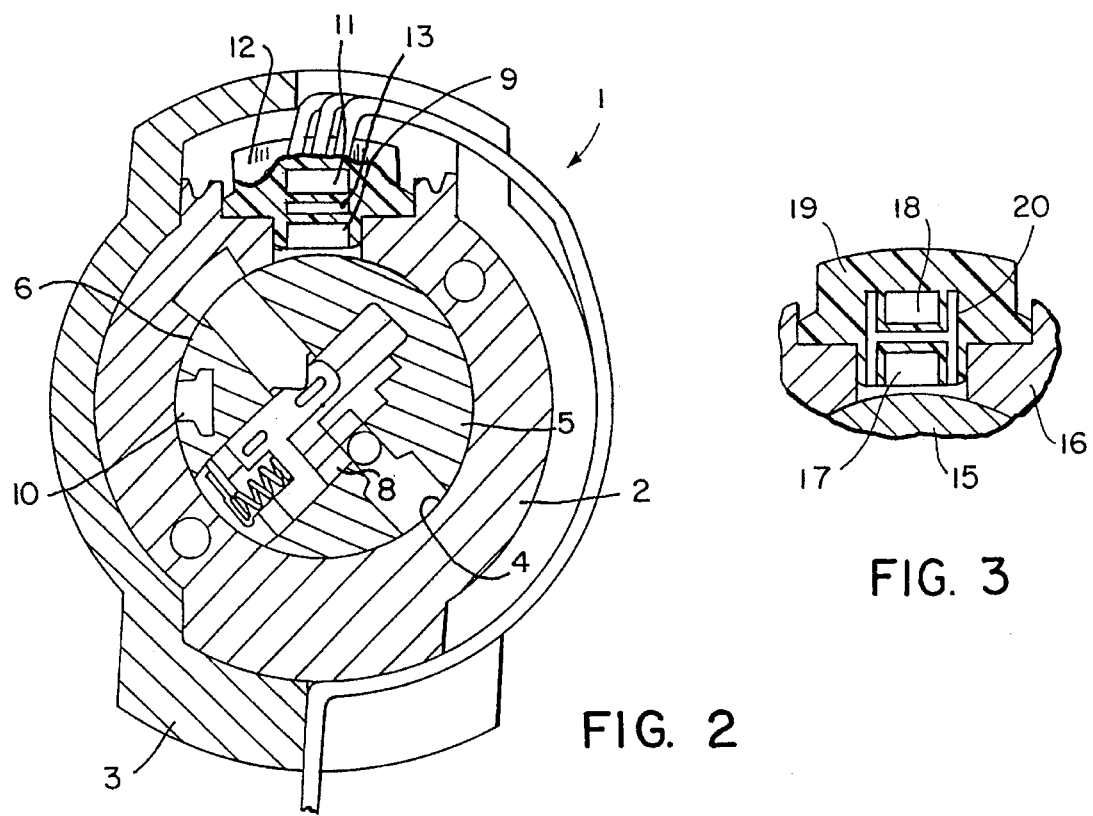
FIG. 2
FIG. 3

ANTI-MAGNETIC TAMPERING SYSTEM FOR AUTOMOBILE IGNITION LOCK

BACKGROUND OF THE INVENTION

The present invention relates to locks, and more particularly to an anti-tampering mechanism for the ignition lock of an automobile.

Various types of locks for use in connection with the ignition circuit of an automobile are known in the art. Many of such locks include anti-theft and/or anti-tampering mechanisms which are incorporated to deter unauthorized use of automobiles. One such lock is disclosed in U.S. Pat. No. 5,202,580. The lock includes a Hall effect sensor dement which is activated by a control magnet on the cylinder of the lock so that when the cylinder is rotated by a key to its start position, the Hall effect sensor element is activated. The activation of the sensor element provides one of several starting criteria to an ignition circuit for starting an automobile. An anti-tampering magnet on the cylinder lies directly under the sensor element in the off position and biases the Hall effect sensor element to its off position so hard that other magnetic forces induced from the exterior of the lock cannot overcome the bias and activate the sensor.

Other anti-theft and/or anti-tampering mechanisms which utilize magnetic elements are shown in U.S. Pat. Nos. 4,862,139 and 4,546,266. Although many of such devices are effective for their intended purpose, there remains a need for improved devices of this type.

SUMMARY OF THE INVENTION

A lock for the ignition circuit of an automobile that utilizes two magnetic field sensors in combination with a magnetic field blocking means disposed between the two sensors. The first sensor is a control sensor which functions in the conventional manner with a permanent magnet on the rotating cylinder. In other words, the lock includes a control Hall effect sensor element which is activated by a control magnet on the cylinder member of the lock so that when the cylinder is rotated by the key to its start position, the control Hall effect sensor element is activated which in turn enables the ignition circuit to start an automobile. The second sensor is an anti-tampering sensor which is spaced from the control sensor. The control sensor trip level is biased high while the anti-tampering sensor trip level is biased low in order to prevent actuation or tapering with the control sensor through the use of an external magnet. The blocking means is preferably in the form of a ferrous plate and has two functions. First, the blocking means prevents the anti-tampering sensor from being tripped by the control magnet on the cylinder member when the cylinder is rotated to its start position. Secondly, the blocking means causes the anti-tampering sensor to be tripped first which provides a false or deactivation signal to the ignition circuit should an external magnet be employed from the exterior of the lock in an attempt to actuate the control sensor.

Accordingly, the present invention provides a lock for an automobile ignition circuit comprising a hollow sleeve defining a cylindrical inner surface; a cylinder rotatably mounted within the sleeve and having a cylindrical outer surface defining a cylindrical interface with the inner face of the sleeve, said cylinder member having a keyway therein for receiving a key used to rotate the cylinder between off and start positions; a control Hall effect sensor on the sleeve for detecting when the cylinder member is rotated to its start position, said control sensor having a first trip level for producing an activation signal; a control magnet on the cylinder member for activating the control sensor when the cylinder member is rotated to its start position; an anti-tampering Hall effect sensor spaced from and adjacent to the control sensor for producing a deactivation signal, said anti-tampering sensor having a second trip level which is lower than the trip level of the control sensor; and blocking means disposed between the control sensor and the anti-tampering sensor to prevent the anti-tampering sensor from being tripped by the control magnet when the cylinder member is rotated to its start position and to enable the anti-tampering sensor to be tripped first to produce the deactivation signal in response to a magnet force induced from the exterior of the lock.

The blocking means preferably comprises a plate composed of a ferrous material. The plate may be fiat so that the control sensor is located adjacent its inner surface and the anti-tampering sensor is located adjacent its outer surface, or the plate may be H-shaped defining inner and outer chambers with the control sensor located within the inner chamber and the anti-tampering sensor located within the outer chamber. In addition, the control sensor and anti-tampering sensor are spaced radially with respect to each other and preferably in radial alignment with each other. However, the sensors may also be spaced axially and/or circumferentially in a staggered relationship to each other.

BRIEF DESCRIPTION OF THE DRAWINGS

The drawings illustrate the best mode presently contemplated of carrying out the invention, In the drawings:

FIG. 1 is a side view in elevation of an ignition lock constructed in accordance with the principles of the present invention;

FIG. 2 is cross-sectional end view of the lock of FIG. 1; and

FIG. 3 is a fragmentary cross-sectional end view of an alternate embodiment for the lock of FIGS. 1–2,

DETAILED DESCRIPTION OF THE PREFERRED EMBODIMENTS

Referring now to the drawings, FIGS. 1 and 2 illustrate an ignition lock generally designated by the numeral 1 constructed in accordance with the principles of the present invention. As illustrated, lock 1 includes a hollow cylindrical sleeve 2 which in turn is fixed within a housing 3. Housing 3 may, for example, comprise a steering column of an automobile, although it is within the scope of the present invention to mount ignition lock 1 in any desired location.

Sleeve 2 includes a cylindrical inner surface 4 and receives an elongated rotatable cylinder member 5 therein. Cylinder number 5 includes a cylindrical outer surface 6 which forms a rotational interface with inner surface 4 of sleeve 2. Cylinder member 5 is rotatable about longitudinal axis 7, and includes a keyway 8 along the axis 7 for receiving a key (not shown) therein. Cylinder member 5 is rotatable between an off position, as shown in FIG. 2 and a start position wherein cylinder member 5 is rotated in a clockwise direction from the position shown in FIG. 2 until magnet 10 is located beneath control sensor 9, as will hereinafter be described. When activated, sensor 9 produces an activation signal which is utilized by the automobile's ignition circuit to start the automobile. After starting, cylinder 5 rotates in a counter-clockwise direction from the start position to a run position, as is conventional. Reference is made to the description contained in allowed U.S. Patent application Ser. No. 07/946,017 filed Sep. 15, 1992, the disclosure of which is specifically incorporated herein by reference, for a complete detailed description of a typical electronic interlock control circuit for an automobile's ignition.

A control sensor element 9, preferably a Hall effect sensor device, is mounted in a sensor module 12 on sleeve 2. Control sensor 9 functions to detect the rotational position of cylinder member 5 in order to insure that the ignition circuit for starting the engine of an automobile is operable only when a proper key is utilized to rotate cylinder member 5. In order to accomplish this, control sensor 9 is located along the rotational interface of surfaces 4 and 6 in order to sense the change in magnetic flux of a control magnet 10 located on cylinder member 5. Control magnet 10 is located along outer surface 6 and is positioned such that rotation of cylinder member 5 causes control magnet 10 to rotate past control sensor 9. Magnet 10 has a magnetic pole orientated radially outwardly at surface 6. Thus, when control magnet 10 passes control sensor 9, sensor 9 is activated or enabled to produce an activation signal which in turn provides one of several starting criteria to the starting module (not shown) of an automobile's ignition circuit.

As is readily apparent, control sensor 9 may easily be compromised when cylinder member 5 is in its off position by employing an external magnet i.e. one located outside of sleeve 2 and/or housing 3. This may be accomplished by simply moving a magnet of sufficient strength adjacent to housing 3 so that it produces a magnetic flux of sufficient strength to trip control sensor 9. In order to prevent this from occurring, lock 1 includes an anti-tampering sensor element 11, preferably a Hall effect sensor device, mounted in sensor module 12 on sleeve 2. As shown best in FIGS. 1 and 2, sensor element 11 is mounted in radial alignment with sensor element 9. However, other orientations of sensor elements 9 and 11 may also be employed, such as ones where sensors 9 and 11 are axially spaced with respect to each other, circumferentially spaced with respect to each other, and/or other staggered relationships. Anti-tampering sensor 11 functions to provide a deactivation signal to the ignition circuit in response to a magnetic force induced from the exterior of the sleeve 2 or housing 3. This is accomplished by setting the trip level for anti-tampering sensor 11 lower than the trip level control sensor 9, i.e. sensor 11 is biased low whereas sensor 9 is biased high. Thus, magnetic forces applied from the exterior of sleeve 2 or housing 3 would cause anti-tampering sensor 11 to be tripped first, thus resulting in a deactivation signal. The magnetic forces would be insufficient to enable control sensor 9 without also enabling anti-tampering sensor 11.

However, due to the fact that the trip level of anti-tampering sensor 11 is lower than the trip level of control sensor 9, it is possible that anti-tampering sensor 11 might become enabled or tripped by control magnet 10 when magnet 10 is rotated with cylinder member 5 from its off position to its start position beneath control sensor 9. Therefore, in order to prevent anti-tapering sensor 11 from being tripped when an automobile is started, the lock 1 includes a magnetic flux blocking means disposed between control sensor 9 and anti-tapering sensor 11. As shown best in FIG. 2, this blocking means comprises a plate 13, preferably composed of a ferrous material. As shown in the embodiment of FIGS. 1 and 2, plate 13 is substantially flat and defines a radially outer surface and a radially inner surface such that control sensor 9 is located adjacent its inner surface and the anti-tampering sensor 11 is located adjacent its outer surface. Thus, plate 13 functions to attenuate the magnetic field of control magnet 10 from reaching anti-tampering sensor 11 during a stating operation. Likewise, plate 13 attenuates the magnetic filed supplied by an external tampering magnet from reaching the control sensor 9. This is accomplished since the ferrous plate 13 acts as a pole piece increasing the magnetic field to the sensor on whichever side of the plate the magnet is located, i.e. the lines of magnetic flux are more concentrated by plate 13, and are prevented from passing through plate 13 by its ferrous composition which provides a return path for the lines of flux.

Referring now to FIG. 13, there is illustrated a second embodiment for the lock of the present invention. In this embodiment, the lock also includes a cylinder member 15 rotatably mounted within a sleeve 16 together with a control sensor 17 and anti-tampering sensor 18 mounted within a module 19. In this embodiment, however, the blocking means comprises an H-shaped plate 20, once again preferably made of a ferrous material. The H-shaped plate 20 defines a radially outer chamber and a radially inner chamber with the control sensor 17 located within the inner chamber and the anti-tampering sensor 18 located within the outer chamber. In all other respects, plate 20 functions identically as fiat plate 13 to prevent anti-tampering sensor 18 from being tripped by the control magnet on cylinder member 15, and to cause the anti-tampering sensor 18 to be tripped first should an external magnet be employed in an attempt to actuate control sensor 17.

In operation, an operator of an automobile would first insert the appropriate key into cylinder member 5 and rotate cylinder member 5 in a clockwise direction until control magnet 10 passes control sensor 9 at which time sensor 9 is enabled or activated. When cylinder member 5 is returned to its off position, i.e. the position shown in FIG. 2, anti-tampering sensor 11 and plate 13 prevent compromising of the control sensor 9 by an external magnet. Thus, upon removal of a key by the operator, external magnetic forces cannot activate or enable sensor 9 without also activating or enabling sensor 11.

Various modes of carrying out the invention are contemplated as being within the scope of the following claims particularly pointing out and distinctly claiming the subject matter regarded as the invention.

I claim:

1. A lock for an automobile ignition circuit, comprising;

a hollow sleeve defining a cylindrical inner surface;

a cylinder member rotatably mounted within said sleeve and having a cylindrical outer surface defining a cylindrical interface with the inner surface of said sleeve, said cylinder member having a keyway therein for receiving a key used to rotate said cylinder between off and start positions;

a control Hall effect sensor on said sleeve for detecting when said cylinder member is rotated to is start position, said control Hall effect sensor having a first trip level for producing an activation signal;

a control magnet on said cylinder member for activating said control Hall effect sensor when said cylinder member is rotated to its start position;

an anti-tampering Hall effect sensor spaced in radial alignment with and adjacent to said control Hall effect sensor, said anti-tampering Hall effect sensor having a second trip level for producing a deactivation signal, the trip level of said anti-tampering Hall effect sensor being lower than the trip level of said control Hall effect sensor;

blocking means disposed between said control Hall effect sensor and said anti-tampering Hall effect sensor to prevent the anti-tampering Hall effect sensor from being tripped by the control magnet when said cylinder member is rotated to its start position and to enable the anti-tampering Hall effect sensor to be tripped to produce said deactivation signal in response to a magnetic force induced from the exterior of said sleeve; and wherein said anti-tampering Hall effect sensor is tripped prior to said control Hall effect sensor in response to the magnetic force induced from the exterior of said sleeve.

2. The lock of claim 1 wherein said blocking means comprises a plate.

3. The lock of claim 2 wherein said plate is composed of a ferrous material.

4. The lock of claim 2 wherein said plate is flat.

5. The lock of claim 4 wherein said fiat plate defines an outer surface and an inner surface, and said control Hall effect sensor is located adjacent said inner surface and said anti-tampering Hall effect sensor is located adjacent said outer surface.

6. The lock of claim 2 wherein said plate is H-shaped.

7. The lock of claim 6 wherein said H-shaped plate defines an outer chamber and an inner chamber and said control Hall effect sensor is located within said inner chamber and said anti-tampering Hall effect sensor is located within said outer chamber.

* * * * *

UNITED STATES PATENT AND TRADEMARK OFFICE
CERTIFICATE OF CORRECTION

PATENT NO. : 5,551,267
DATED : Sep. 3, 1996
INVENTOR(S) : Janssen, et al.

It is certified that error appears in the above-indentified patent and that said Letters Patent is hereby corrected as shown below:

Title page of issued patent: "5/1975" in place of "5/1973" for French Document No. 2249228;
Column 1, Line 14: "element" in place of "dement";
Column 1, Line 47: "tampering" in place of "tapering";
Column 2, Line 16: "flat" in place of "fiat";
Column 3, Line 59: "anti-tampering" in place of "anti-tapering";
Column 3, Line 62: "anti-tampering" in place of "anti-tapering";
Column 3, Line 65: "flat" in place of "fiat";
Column 4, Line 4: "starting" in place of "stating";

Column 4, Line 24: "flat" in place of "fiat";

Column 6, Line 2: "flat" in place of "fiat".

Signed and Sealed this

Sixth Day of January, 1998

Attest:

BRUCE LEHMAN

*Attesting Officer*     *Commissioner of Patents and Trademarks*